United States Patent [19]

Katayama et al.

[11] 4,230,840

[45] Oct. 28, 1980

[54] PROCESS FOR PRODUCING HYDROCARBON RESINS HAVING IMPROVED COLOR AND THERMAL STABILITY

[75] Inventors: Shigeru Katayama, Iwakuni; Mutsuhiro Aoki, Ohtake, both of Japan

[73] Assignee: Mitsui Petrochemical Industries Ltd., Tokyo, Japan

[21] Appl. No.: 973,445

[22] Filed: Dec. 26, 1978

[51] Int. Cl.$^2$ .......................................... C08F 240/00
[52] U.S. Cl. .......................................... 526/77; 526/290
[58] Field of Search .......................................... 526/77, 290

[56] References Cited

U.S. PATENT DOCUMENTS

| | | |
|---|---|---|
| 2,770,613 | 11/1956 | Tegge et al. . |
| 2,798,865 | 7/1957 | Banes et al. .......................... 526/77 |
| 2,946,775 | 7/1960 | de Vries et al. ....................... 526/77 |
| 3,855,187 | 12/1974 | Winkler et al. ....................... 526/77 |
| 3,911,040 | 7/1975 | Shelton et al. ....................... 526/77 |
| 4,072,808 | 2/1978 | Lakshmanan et al. ................ 526/77 |
| 4,105,843 | 8/1978 | Iwase et al. . |

FOREIGN PATENT DOCUMENTS 36-19287 10/1961 Japan .
43-21737 9/1968 Japan .

*Primary Examiner*—Harry Wong, Jr.
*Attorney, Agent, or Firm*—Sherman & Shalloway

[57] ABSTRACT

A process for producing a hydrocarbon resin having improved color and thermal stability, which comprises treating a petroleum cracking or reforming fraction containing cationically polymerizable hydrocarbons and not more than 0.7% by weight, based on the fraction, of cyclopentadienes and having a boiling range of from 140° C. to 280° C., with 0.8 to 3.0 moles, per mole of the cyclopentadienes, of a dienophile compound having a carbon-to-carbon double bond and a carbonyl or cyano group adjacent to the double bond; and then polymerizing the treated petroleum fraction in the presence of a polymerization catalyst.

23 Claims, No Drawings

PROCESS FOR PRODUCING HYDROCARBON RESINS HAVING IMPROVED COLOR AND THERMAL STABILITY

This invention relates to an improved process for producing hydrocarbon resins. More specifically, it relates to a process for producing hydrocarbon resins having greatly reduced coloration and very high thermal stability which consist mainly of aromatic hydrocarbon units.

It has been well known to produce hydrocarbon resins by polymerizing a thermal cracking or reforming petroleum fraction containing unsaturated hydrocarbons using Friedal-Crafts catalysts. The hydrocarbon resins are classified into aliphatic hydrocarbon resins obtained by polymerizing a petroleum fraction containing aliphatic unsaturated hydrocarbons as main constituents and having a boiling range of from −20° C. to 100° C., and aromatic hydrocarbon resins obtained by polymerizing a petroleum fraction containing aromatic unsaturated hydrocarbons as main constituents and having a boiling range of from 140° C. to 280° C. The aromatic hydrocarbon resins have lower thermal stability, stronger offensive odor and greater coloration than the aliphatic species. For this reason, it has previously been considered as difficult to use the aromatic hydrocarbon resins in applications which require superior thermal stability, a low degree of odor or freedom from odor, or a low degree of coloration, for example in hot-melt adhesives, pressure-sensitive adhesives, or thermo-fusible traffic paints.

Methods have previously been suggested for pretreating a petroleum fraction containing unsaturated hydrocarbons, mainly aliphatic unsaturated hydrocarbons, having a boiling point of not more than 280° C. and containing at least 5 carbon atoms to remove from it undesirable components which will worsen the color or hydrocarbon resins and/or form a gel (insoluble polymer), especially cyclodienes such as cyclopentadiene or methylcyclopentadiene. For example, U.S. Pat. No. 2,770,613 discloses a method for removing them by pre-heating the fraction at 90° to 140° C. to dimerize cyclodienes. According to this method, however, the treating operation is complicated, and because unsaturated hydrocarbon components in an unsaturated hydrocarbon-containing fraction of the polymerization material are removed as adducts with cyclopentadienes, the loss of unsaturated hydrocarbons other than cyclopentadienes is great. When this method is applied to the polymerization of a fraction containing aliphatic unsaturated hydrocarbons, some degree of improvement in color is noted. However, even if this method is applied to the polymerization of a petroleum cracking or reforming fraction containing aromatic unsaturated hydrocarbons having a boiling range of 140° to 280° C. and containing fairly large amounts of cyclopentadienes, it is impossible to obtain a hydrocarbon resin having superior color, high thermal stability and freedom from odor.

Japanese Patent Publication No. 21737/68 discloses a process for producing a petroleum resin, which comprises contacting a steam cracking unsaturated petroleum fraction containing 1 to 3% by weight of cyclodienes at room temperature with 0.5 to 2 moles, per mole of the cyclodienes, of maleic anhydride to form a cyclodiene/maleic anhydride adduct, removing the adduct, then removing cyclodiene, and polymerizing the remainder in the presence of a catalyst. Since an unsaturated petroleum fraction containing as large as 1 to 3% by weight of a cyclodiene such as cyclopentadiene is used as a starting steam cracking unsaturated petroleum fraction, a large amount of maleic anhydride must be used to produce an adduct of the cyclodienes. As a result, a large quantity of the adduct must be removed, and the operation becomes complicated. In addition, the use of a large amount of maleic anhydride in this method tends to corrode the equipment. Furthermore, as is seen from the Examples given in this Japanese Publication, aliphatic hydrocarbon resins obtained from steam-cracking unsaturated petroleum fractions having a boiling range of 20° to 100° C. and aromatic hydrocarbon resins obtained from steam-cracking unsaturated petroleum fractions having a boiling range of 100° to 200° C. have a Gardner color number of 9-12 and 14-18, respectively. Even when this method is applied to the polymerization of aromatic unsaturated hydrocarbon-containing fractions having a boiling range of 140° to 280° C., it is impossible to obtain hydrocarbon resins having good color, very high thermal stability and freedom from odor.

Japanes Patent Publication No. 19287/61 discloses a process for producing a hydrocarbon resin having a high acid value and a high saponification value by polymerizing unsaturated hydrocarbons having a boiling range of 20° to 280° C. obtained during petroleum refining, petroleum cracking, and the like after adding an unsaturated acid or its anhydride. This Japanese Patent Publication states that the resulting hydrocarbon resin is light-colored. However, if an unsaturated hydrocarbon resin-containing fraction having a boiling range of 20° to 280° C. obtained during the thermal cracking of petroleum is polymerized in the presence of an unsaturated acid or its anhydride without adjusting the content of cyclopentadienes in it, it is impossible to obtain a hydrocarbon resin having fully satisfactory color, thermal stability and odor, as described in the Examples of this Publication.

In an attempt to remedy the aforesaid defects of the conventional methods, German Offenlegungsschrift No. 2716763 discloses a process for preparing a hydrocarbon resin having improved color and thermal stability, which comprises heat-treating a petroleum cracking or reforming fraction containing cationically polymerizable hydrocarbon resins and having a boiling range of from 140° C. to 280° C. with an $\Delta,\beta$-unsaturated dicarboxylic acid anhydride at a temperature of from 50° to 250° C., and then polymerizing the treated petroleum fraction in the presence of a cationic polymerization catalyst. According to this process, the color, odor and thermal stability of the resulting aromatic hydrocarbon resin can be improved to a fairly satisfactory degree. However, since the starting petroleum fraction is heat-treated with an $\alpha,\beta$-unsaturated dicarboxylic acid without removing cyclopentadienes from it in advance, the $\alpha,\beta$-unsaturated dicarboxylic acid anhydride is required in a relatively large amount, and consequently, in order to obtain hydrocarbon resins of good quality, large amounts of the adduct must be removed. Furthermore, the treatment must be performed under heat, and the corrosion of the equipment becomes a problem.

It is an object of this invention to provide a new process for producing a hydrocarbon resin, which is free from the aforesaid defects.

Another object of this invention is to provide a process for producing hydrocarbon resins having a high level of color and thermal stability.

Still another object of this invention is to provide a process for producing an aromatic hydrocarbon resin having greatly improved color and thermal stability in which the pretreatment can be performed at relatively low temperatures for relatively short periods of time using the minimized amount of a treating agent such as maleic anhydride, and the adduct does not need to be removed.

Other objects and advantages of the invention will become apparent from the following description.

According to the present invention, there is provided a process for producing a hydrocarbon resin having improved color and thermal stability, which comprises treating a petroleum cracking or reforming fraction containing cationically polymerizable hydrocarbons and not more than 0.7% by weight, based on the fraction, of cyclopentadienes and having a boiling range of from 140° C. to 280° C., with 0.8 to 3.0 moles, per mole of the cyclopentadienes, of a dienophile compound having a carbon-to-carbon double bond and a carbonyl or cyano group adjacent to the double bond; and then polymerizing the treated petroleum fraction in the presence of a polymerization catalyst.

The "petroleum cracking or reforming fraction" used as a starting material in the process of this invention denotes a hydrocarbon-containing fraction which is formed as a by-product in the thermal or catalytic cracking (such as steam cracking, vapor phase cracking, or sand cracking) or reforming (such as hydroreforming) of petroleums such as naphtha, gas oils or kerosene. In the present invention, a petroleum cracking or reforming fraction having a boiling range of from 140° C. to 280° C., preferably from 140° C. to 240° C., is particularly used.

The petroleum cracking or reforming fraction, as will be described in detail hereinbelow, usually contains cyclopentadienes such as cyclopentadiene, methylcyclopentadiene, fulvene, methylfulvene and dimethylfulvene, and dicyclopentadienes such as dicyclopentadiene, methyldicyclopentadiene and dimethyldicyclopentadiene in addition to other various cationically polymerizable hydrocarbons. When a fraction having a boiling range of 140° to 280° C. is to be formed by fractional distillation of this petroleum cracking or reforming fraction, lower boiling products, such as cyclopentadiene or methylcyclopentadiene, formed by gradual decomposition of the dicyclopentadienes during distillation will usually be contained in the resulting fraction having a boiling range of 140° to 280° C. in addition to fulvene, methylfulvene and dimethylfulvene having a boiling point of 140° to 280° C. Accordingly, the petroleum cracking or reforming fraction having a boiling range of from 140° to 280° C. usually contains as much as about 1 to about 7% by weight, particularly 1.5 to 3% by weight, based on the weight of the fraction, of the cyclopentadienes.

The present inventors made extensive investigations in order to produce aromatic hydrocarbon resins having very much improved color, thermal stability and odor which can be used as tackifying resins for hot-melt adhesives and pressure-sensitive adhesives which require the use of aromatic hydrocarbon resins having improved color and thermal stability from a petroleum cracking or reforming fraction containing such large amounts of cyclopentadienes and having a boiling range of 140° to 280° C. These investigations led to the discovery that hydrocarbon resins having greatly improved color and thermal stability which meets the above objectives can be obtained by subjecting a petroleum cracking or reforming fraction having a boiling range of from 140° to 280° C. and containing as high as at least about 1% by weight, based on the fraction, of cyclopentadienes such as cyclopentadiene, methylcyclopentadiene, fulvene, methylfulvene and dimethylfulvene to a separating operation such as distillation to adjust its content of the cyclopentadienes to not more than 0.7% by weight, treating the resulting unsaturated hydrocarbon-containing petroleum fraction with a specified dienophile compound, and then polymerizing the treated product.

The invention will be described below in greater detail.

The fraction containing cationically polymerizable hydrocarbons which is used as a raw material for the hydrocarbon resins is a fraction having a boiling range of 140° C. to 280° C., preferably 140° C., to 240° C., which is obtained as a by-product in the thermal or catalytic cracking (e.g., steam cracking, vapor phase cracking or sand cracking) or reforming (e.g., hydroreforming) of petroleums such as naphtha, gas oils or kerosene. This fraction contains at least about 1% by weight, usually 1 to 7% by weight, particularly 1.5 to 3% by weight, based on the weight of the fraction, of cyclopentadienes.

In the present specification and the appended claims, the term "cyclopentadienes" (to be sometimes referred to hereinbelow as "CPDs") generically denote compounds having a 5-membered carboxylic ring of the following formula

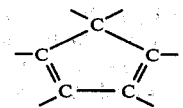

(i.e., a cyclpentadiene ring) in the molecule. Typically, CPDs include cyclopentadiene, methylcyclopentadiene, fulvene, methylfulvene, and dimethylfulvene.

The petroleum cracking or reforming fraction having a boiling range of from 140° C. to 280° C. which can be used as a starting material can be obtained by fractionally distilling a fraction containing hydrocarbons having a boiling range of about −20° C. to +280° C. Because dicyclopentadiene, methyldicyclopentadiene and dimethyldicyclopentadiene inherently contained in the fraction decompose and distill out during the fractional distillation, cyclopentadienes such as cyclopentadiene, methyl cyclopentadiene and fulvene will be contained in the resulting petroleum cracking or reforming fraction having a boiling range of 140° to 280° C. in spite of their lower boiling point. Furthermore, methylfulvene and dimethylfulvene and inherently contained in the petroleum cracking or reforming fraction having the aforesaid boiling range. In many cases, the resulting petroleum cracking or reforming fraction having a boiling range of 140° to 280° C. usually contains 1 to 7% by weight, particularly 1.5 to 3% by weight, of the cyclopentadienes. In the present invention, a petroleum cracking or reforming fraction contains at least about 1% by weight, based on the weight of the fraction, of cyclopentadienes.

The petroleum cracking or reforming fraction having a boiling range of from 140° C. to 280° C. also contains cationically polymerizable hydrocarbons and non-polymerizable hydrocarbons, most of which contain at least 8 carbon atoms. The hydrocarbons with at least 8 carbon atoms are contained generally in an amount of at least 90% by weight based on the weight of the fraction. Specifically, the composition of the petroleum fraction varies over a broad range according, for example, to the type of the petroleum cracked or reformed and the cracking or reforming conditions. According to the present invention, a fraction containing at least 20% by weight, preferably 30 to 75% by weight, more preferably 35 to 60% by weight, based on the weight of the fraction, of cationically polymerizable hydrocarbons is advantageously used.

Hydrocarbons having at least 8 carbon atoms contained in the fraction are almost all aromatic hydrocarbons, the major proportion of which consists of aromatic hydrocarbons containing 9 or 10 carbon atoms. The total amount of such aromatic hydrocarbons with 9 or 10 carbon atoms is 50 to 95% by weight, usually 60 to 95% by weight, based on the weight of the fraction. The fraction contains some amounts of aromatic hydrocarbons containing 8 carbon atoms and more than 10 carbon atoms.

Typical examples of the cationically polymerizable hydrocarbons contained in the fraction are cationically polymerizable aromatic hydrocarbons containing 8 to 12 carbon atoms, such as styrene, $\alpha$- or $\beta$-methylstyrene, o-, m- or p-vinyltoluene, indene, methylindene, or divinylbenzene. Other non-typical cationically polymerizable aromatic hydrocarbons include $C_8$ to $C_{12}$ olefins and/or diolefins such as dicyclopentadiene or methyldicyclopentadiene which are present in minor quantities.

On the other hand, typical examples of the non-polymerizable hydrocarbons contained in the fraction include $C_8$ to $C_{12}$ aromatic hydrocarbons such as xylene, ethylbenzene, cumene, ethyltoluene, n-propylbenzene, trimethylbenzene, indane, methylindane, naphthalene, methylnaphthalene, and dimethylnaphthalene. Other examples of the non-polymerizable hydrocarbons are $C_8$ to $C_{12}$ paraffins and/or naphthenes which are present in small amounts.

As stated hereinabove, the composition of the petroleum cracking or reforming fraction used in this invention changes over a wide range according, for example, to the petroleum cracked or reformed, and the cracking or reforming conditions, and cannot be definitely determined. Generally, the fraction preferably has a bromine value of 50 to 90. Fractions having the following compositions are especially preferably used. It should be noted however that the present invention is not limited to the following exemplification.

| Components | Amounts in percent by weight |
|---|---|
| Cationically polymerizable aromatic hydrocarbons | 25 to 75, preferably 30 to 60 |
| Olefins | 0 to 5, preferably 1 to 3 |
| Other Diolefins | 1 to 10, preferably 1 to 5 |
| CPDs | 1 to 7, preferably 1.5 to 3 |
| Non-polymerizable aromatic hydrocarbons | 15 to 65, preferably 20 to 50 |
| Paraffins and naphthenes | 1 to 10, preferably 1 to 5 |

Typical examples of the olefins and other diolefins given in the above table are aliphatic and cycloaliphatic mono- and di-olefins containing 9 to 12 carbon atoms.

The non-polymerizable aromatic hydrocarbons are typified by $C_9$ to $C_{12}$ alkylbenzenes (main components), indane and $C_9$ to $C_{11}$ derivatives thereof with traces of benzene, toluene and xylene, and naphthalene and $C_{11}$ to $C_{12}$ derivatives thereof. Typical examples of the paraffins and naphthenes are paraffins and naphthenes containing 9 to 12 carbon atoms.

The cationically polymerizable aromatic hydrocarbon component in the fraction typically consists of the following components.

| Components | | Amounts in % by weight (*) |
|---|---|---|
| Vinyl toluene<br>Indene | Total | 30 to 85, preferably 35 to 70 |
| Styrene<br>$\alpha$-Methylstyrene<br>Methylindene<br>$\beta$-Methylstyrene | Total | 3 to 50, preferably 5 to 30 |

According to this invention, the petroleum cracking or reforming fraction containing CPDs is subjected to an operation of removing the CPDs to reduce the content of CPDs to below 0.7% by weight based on the weight of the fraction. Preferably, this removal can be achieved by fractional distillation. The fractional distillation can be performed in a manner known per se. It is effective to perform continuous distillation by a side-cut method shown below. Specifically, the petroleum cracking or reforming fraction containing CPDs is fed into the middle portion of a distillation tower usually having 10 to 20 bubble cap trays. The temperature of the bottom of the tower is adjusted to not more than about 210° C., preferably 150° to 200° C. A low-boiling fraction having concentrated CPDs is taken out from the top of the tower; the main fraction (to be subjected to the polymerization reaction) having a reduced content of CPDs, from the top of the tower (from 2nd to 4th trays when the number of trays is 10; from 4th to 8th trays when there are 20 trays); and a high-boiling fraction having a low content of polymerizable ingredients, from the bottom of the tower. By suitably selecting the pressure of the distillation tower and the reflux ratio, the main fraction having a very low concentration of CPDs can be taken out while minimizing the amounts of the fractions to be withdrawn from the top and bottom of the tower. The pressure and reflux ratio at this time vary according to the type of the starting fraction, and cannot be definitely set. Generally, the suitable pressure is 150 to 200 mmHg, and the suitable reflux ratio is from 1 to 5, preferably from 2 to 4.

According to this invention, the removal of CPDs can also be performed by the heat-treatment of petroleum cracking or reforming fraction with an $\alpha$, $\beta$-unsaturated dicarboxylic acid anhydride and the subsequent removal of the adduct with the acid anhydride by distillation, as disclosed in German Offenlegungsschrift No. 2716763 (corresponding to U.S. Pat. No. 4,105,843); or by the preliminary polymerization of the fraction in the presence of a solid acid and the subsequent removal of the resulting polymers of CPDs by distillation. The removal method described in the above U.S. Patent will be described below at some length.

The $\alpha,\beta$-unsaturated dicarboxylic acid anhydride that can be used in the former heat-treatment includes organic compounds containing two carboxyl groups bonded to each other in the form of anhydride and an unsaturated bond, especially a double bond, between the carbon atoms (α-carbon atom) to which one of the carboxyl groups is bonded and a carbon atom adjacent thereof (β-carbon atom). Suitable anhydrides are aliphatic or alicyclic α,β-unsaturated dicarboxylic acid anhydrides containing up to 15 carbon atoms, preferably 4 to 10 carbon atoms. Especially preferred α,β-unsaturated carboxylic acid anhydrides include maleic anhdydride, itaconic anhydrite, citraconic anhydride, $\Delta^1$-tetrahydrophthalic anhydride, and $\Delta^2$-tetrahydrophthalic anhydride. Of these, the aliphatic α,β-unsaturated dicarboxylic acid anhydrides, especially maleic anhydride, are especially suitable.

The amount of the α,β-unsaturated dicarboxylic acid anhydride is not critical, and can be varied over a wide range according, for example, to the type of the petroleum fraction to be treated or the temperature of the heat-treatment. Generally, the amount is at least 0.5% by weight, preferably 1 to 20% by weight, more preferably 2 to 10% by weight, based on the weight of the cationically polymerizable hydrocarbons in the petroleum cracking or reforming fraction.

The heat-treatment of the fraction with the α,β-unsaturated dicarboxylic acid anhydride is carried out at a temperature of 50° to 250° C., preferably 70° to 200° C., most preferably 90° to 150° C. The heat-treatment can be performed usually at atmospheric pressure, but if desired, at elevated or reduced pressures. The heat-treatment time is not critical, and can be varied over a wide range according, for example, to the type of the fraction, the type or amount of the acid anhydride, or the heat-treatment temperature. Generally, the heat-treatment time is at least 0.5 minute, preferably 1 minute to 10 hours, more preferably 30 minutes to 5 hours.

The above heat-treatment can also be performed in the presence of 0.005 to 10% by weight, preferably 0.01 to 5% by weight, based on the total weight of the cationically polymerizable hydrocarbons, of an acid such as Lewis acids or Brønsted acids (proton acids).

The petroleum cracking or reforming fraction thus heat-treated with the α,β-unsaturated dicarboxylic acid anhydride is then distilled to remove the adducts of the CDPs with the acid anhydride in the petroleum cracking or reforming fraction. The distillation can be performed in a manner known per se. For example, flash distillation suffices if the temperature of the tower bottom is maintained at not more than 150° C. to inhibit the decomposition of the adducts.

One recommended procedure for removing CPDs from the petroleum cracking and reforming fraction by the preliminary polymerization described hereinabove comprises treating the fraction in the presence of a solid acid, and then subjecting the treated product to flash distillation to remove the polymerized CPDs from the bottom of the distillation tower. Suitable solid acids include silica-alumina and activated clay. CPDs alone can be polymerized with a fairly high selectivity by adding the solid acid in an amount 0.5 to 10 times the weight of CPDs to the petroleum cracking or reforming fraction, and treating the mixture at 0° to 50° C. for 0.5 to 2 hours. Usual flash distillation of the product results in a fraction free from CPDs.

By the above operation of removing CPDs, a petroleum cracking or reforming fraction containing cationically polymerizable hydrocarbons and having a boiling range of from 140° to 280° C. can be obtained which has a CPD content of not more than 0.7% by weight, preferably 0.01 to 0.5% by weight, more preferably 0.05 to 0.3% by weight, based on the weight of the fraction.

The process of this invention is characterized by treating the resulting petroleum cracking or reforming fraction having a decreased content of CPDs so obtained with a dienophile compound having a carbon-to-carbon double bond and a carbonyl or cyano group adjacent to the double bond.

The term "dienophile compound", used herein, denotes a compound capable of easily performing a Diels-Alder reaction with CPPs (dienes) to form adducts. In the present invention, those dienophile compounds which have a carbonyl or cyano group adjacent to a double bond are used. Suitable dienophile compounds for use in the process of this invention are α,β-unsaturated dienophile compounds which contain 1 to 2 double bonds and adjacent thereto, at least 1, preferably 1 to 4, more preferably 2 to 3, radical selected from the group consisting of a carboxyl group (—COOH), a carboxylic acid anhydride group (—CO—O—CO—), a carboxylic acid ester group (—COOR$^1$), a carboxylic acid amine group

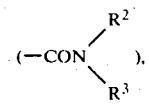

a carboxylic acid imide group (—CO—NH—CO—), a cyano group (—CN), a formyl group (—CHO) and a keto group

and generally 3 to 15, preferably 3 to 10, and more preferably 4 to 10, carbon atoms.

Typical examples of the α,β-unsaturated dienophile compounds which can be used in the present invention are given below.

(A) α,β-Unsaturated carboxylic acids

Suitable α,β-unsaturated carboxylic acids that can be used in this invention are aliphatic or cycloaliphatic α,β-unsaturated mono- or di-carboxylic acids containing up to 15, preferably 3 to 10, carbon atoms. Specific examples include acrylic acid, methyacrylic acid, α-ethylacrylic acid, crotonic acid, maleic acid, citraconic acid, $\Delta^1$-tetrahydrophthalic acid, and $\Delta^2$-tetrahydrophthalic acid. The α,β-unsaturated dicarboxylic acids are preferred, and maleic acid is especially preferred.

(B) α,β-Unsaturated carboxylic acid anhydrides

In the present invention, aliphatic or cycloaliphatic α,β-unsaturated dicarboxylic acid anhydrides containing generally up to 15 carbon atoms, preferably 4 to 10 carbon atoms, are suitable. Examples are maleic anhydride, itaconic anhydride, citraconic anhydride, $\Delta^1$-tetrahydrophthalic anhydride, and $\Delta^2$-tetrahydrophthalic anhydride. The aliphatic α,β-unsaturated dicarboxylic acid anhydrides, above all maleic anhydride, are preferred.

(C) α,β-Unsaturated carboxylic acid esters

Suitable esters are alkyl esters, particularly lower alkyl esters, of the α,β-unsaturated mono- or di-dicarboxylic acids described in paragraph (A) above. Specific examples include methylacrylate, ethyl acrylate, methyl methacrylate, ethyl methacrylate, methyl crotonate, dimethyl maleate, diethyl maleate, dimethyl itaconate, diisopropyl citraconate, and diethyl tetrahydrophthalate.

(D) $\alpha,\beta$-Unsaturated carboxylic acid amides

Suitable amides are amides of the $\alpha,\beta$-unsaturated mono- or di-carboxylic acids described in paragraph (A) above, in which the nitrogen atom can be substituted by one or two alkyl groups, particularly lower alkyl groups. Specific examples include acrylamide methacrylamide, crotonamide, maleinamide, itaconamide, citraconamide, and tetrahydrophthalamide.

(E) $\alpha,\beta$-Unsaturated carboxylic acid imides

Suitable imides are imides of the $\alpha,\beta$-unsaturated dicarboxylic acids described in paragraph (A) above. Typical examples are maleimide, itaconimide, citraconimide, and tetrahydrophthalimide.

(F) $\alpha,\beta$-Unsaturated nitriles

Suitable nitriles are those containing 1 carbon-carbon double bond and 1 to 4 cyano groups adjacent to the double bond, and 3 to 10, preferably 3 to 6, carbon atoms. Specific examples are acrylonitrile, methacrylonitrile, crotononitrile, maleonitrile, citracononitrile and tetracyanoethylene.

(G) $\alpha,\beta$-Unsaturated aldehydes

Suitable aldehydes are those having one carbon-carbon double bond, 1 to 2 formyl groups adjacent to the double bond, and 3 to 10, preferably 3 to 6, carbon atoms. Examples include acrolein, methacrolein, crotonaldehyde and maleic dialdehyde.

(H) Quinones

Suitable quinones are benzoquinone and naphthoquinone.

The term "lower alkyl" used in the present specification denotes a linear or branched alkyl group having 1 to 6, preferably 1 to 4, carbon atoms, and includes, for example, methyl, ethyl, n- or iso-propyl, n-, sec-, iso- or tert-butyl, n-pentyl, iso-amyl, and n-hexyl.

The $\alpha,\beta$-unsaturated dicarboxylic acid anhydrides, especially maleic anhydride, described in paragraph (B) above can be used especially advantageously in this invention.

The amount of the dienophile compound is not restricted to a narrow range, and can be chosen from a wide range. However, even if it is used in a larger amount than is necessary, no corresponding technical advantage can be obtained. Such large amounts are wasteful, and rather pose a problem of corroding the equipment.

A great feature of the process of this invention is that the amount of the dienophile compound can be reduced very much. This solves the problem of equipment corrosion, and can eliminate the need for an additional step of separating the adducts formed between the dienophile and cyclopentadienes.

In the present invention, the dienophile compound can be used in an amount of 0.8 to 3.0 moles, preferably 1.0 to 2.5 moles, more preferably 1.5 to 2.0 moles, per mole of CPDs contained in the petroleum cracking or reforming fraction to be treated.

The dienophile compound does not need to be completely dissolved in the petroleum cracking or reforming fraction. Desirably, however, it is at least partially soluble in the petroleum fraction under the treating conditions. When it is substantially insoluble in the petroleum fraction, it is preferred to dissolve it in a solvent compatible with the fraction before adding to the petroleum fraction.

The treatment of the petroleum fraction with the dienophile compound can be performed by adding the dienophile compound as a liquid, solid, melt or solution to the petroleum fraction, and contacting them intimately with each other. The treating temperature is not critical, and can be varied widely according to the type of the dienophile compound used, etc. Generally, temperatures of 10° to 150° C., preferably 10° to 100° C., more preferably room temperature to less than 50° C., are advantageous.

The treatment can be effected usually under atmospheric pressure, but if required, it may be carried out under elevated or reduced pressures. The time required for the treatment is not critical, and can be varied widely according to the amount of CPDs in the petroleum fraction, the type of the dienophile compound, etc. Since in the present invention, the amount of CPDs contained in the petroleum fraction is far smaller than that in fractions treated by conventional methods, the treating time can be greatly shortened. The sufficient treating time is usually at least 30 seconds, preferably 1 minute to 1.0 hours, more preferably 5 minutes to 30 minutes, according to the treating temperature.

The treatment with the dienophile alone can lead to hydrocarbon resins having very good color and thermal stability, but if desired, this treatment may be carried out in the presence of a small (less than 1%) amount of solid acid or Lewis acid.

The petroleum cracking or reforming fraction treated with the dienophile compound in the manner described above can be directly submitted to a polymerization step in accordance with the process of this invention. This is one great advantage of the invention.

The polymerization can be carried out by any known method used in the production of ordinary hydrocarbon resins.

Polymerization catalysts normally used in this invention are Friedel-Crafts catalysts such as boron trifluoride, boron trifluoride complexes (e.g., boron trifluoride/phenol complex), aluminum trichloride, aluminum tribromide, tin tetrachloride, and titanium tetrachloride. These polymerization catalysts can be used in an amount of generally 0.1 to 5% by weight, preferably 0.5 to 3% by weight, according to their abilities.

The polymerization can be carried out usually at a temperature of $-30°$ to 80° C., preferably $-10°$ to 50° C., more preferably 10° to 40° C. Atmospheric pressure suffices as the polymerization pressure. If desired, the polymerization may be carried out at elevated or reduced pressures in the range of 0.1 to 10 atmospheres.

Under the above-mentioned conditions, the polymerization can be completed usually within 30 minutes to 5 hours.

After the polymerization, the catalyst can be removed by such a treatment as washing with an alkali aqueous solution or with water, and the unreacted hydrocarbons or low polymers can be removed by a suitable means such as distillation. Advantageously, the distillation is carried out generally at a temperature of 150° to 250° C. and 5 mmHg to 100 mmHg. As a result, hydrocarbon resins can be obtained as distillation bottoms.

In the above polymerization, a small amount of another monomer copolymerizable with the cationically polymerizable hydrocarbons can be added to the petroleum fraction in order to modify them. For example, a petroleum cracking or reforming fraction containing cationically polymerizable $C_4$ or $C_5$ hydrocarbons and having a boiling range of $-20°$ to $100°$ C. can be added to the preheated petroleum fraction in an amount of 10 to 100% by weight, preferably 15 to 80% by weight.

The process of the present invention described hereinabove can afford aromatic hydrocarbon resins free from poor thermal stability, strong odor and a high degree of coloration which are the defects of the conventional aromatic hydrocarbon resins. The hydrocarbon resins obtained by the present invention have greatly improved thermal stability, coloration and odor, and exhibit higher thermal stability, lesser coloration and lesser odor than aromatic hydrocarbon resins prepared by the process described in German Offenlegungsschrift No. 2716763 (corresponding to U.S. Pat. No. 4,105,843) which discloses the closest art to the process of this invention.

Another advantage of the process of this invention is that since any catalyst-poisoning components present in the starting petroleum cracking or reforming fraction can be removed by the heat-treatment of the fraction, the amount of the polymerization catalyst can be reduced as compared with the conventional methods.

Because of their high thermal stability, little odor and low degrees of coloration, the hydrocarbon resins produced by the process of this invention can be advantageously used as binder components in hot-melt adhesives, pressure-sensitive adhesives, and thermofusible traffic paints.

The following examples specifically illustrate the process of the present invention.

EXAMPLE 1

A naphtha cracking fraction (A) having a boiling range of 140° to 240° C. and the following composition was used as a starting material.

TABLE 1

| Composition of naphtha cracking fraction (A) | |
|---|---|
| Components | Content (% by weight based on the total weight of the fraction (A)) |
| Cyclopentadienes | 1.8 |
| Styrene | 0.9 |
| α-Methylstyrene | 1.2 |
| β-Methylstyrene | 0.3 |
| Dicyclopentadiene | 0.8 |
| Vinyltoluenes (o, m, p) | 21.5 |
| Methyldicyclopentadienes | 1.2 |
| Dimethyldicyclopentadienes | 1.7 |
| Indene | 12.8 |
| Methylindenes | 4.1 |
| Saturated $C_8$-$C_{11}$ aromatic hydrocarbons | 53.7 |

The starting fraction (A) was fed into a distillation tower having the specification shown in Table 2, and distilled under the operating conditions indicated in Table 2. A low-boiling fraction containing cyclopentadienes was withdrawn from the top of the tower; a high-boiling fraction, from the bottom of the tower; and a main fraction having a low content of cyclopentadienes, from the 7th tray of the distillation tower.

TABLE 2

| Specification of the distillation tower and the operating conditions | |
|---|---|
| Type of trays | Rubble cap trays |
| Number of trays | 10 |
| Tray to which the starting material was fed | 5th from the bottom |
| Feeding temperature (°C.) | 108 |
| Temperature (°C.) of the bottom of the tower | 206 |
| Pressure (mmHg, abs.) of the bottom of the tower | 250 |
| Temperature (°C.) of the top of the tower | 96 |
| Pressure of the top of the tower (mmHg, abs.) | 200 |
| Reflux ratio | 2 |
| Tray from which the main fraction was withdrawn | 7 |
| Temperature (°C.) of the tray from which the main fraction was withdrawn | 135 |

By the distillation, 8% by weight of the low-boiling fraction and 21% by weight of the high-boiling fraction were removed from the starting fraction (A) to form a main fraction (B).

TABLE 3

| Composition of the main fraction (B) | |
|---|---|
| Components | Content (% by weight based on the weight of the fraction (B)) |
| Cyclopentadienes | 0.2 |
| Styrene | 0.5 |
| α-Methylstyrene | 1.0 |
| β-Methylstyrene | 0.3 |
| Dicyclopentadiene | 0.5 |
| Vinyltoluenes (o, m, p) | 21.8 |
| Methyldicyclopentadienes | 1.0 |
| Dimethyldicyclopentadienes | 1.6 |
| Indene | 12.6 |
| Methylindenes | 2.0 |
| Saturated $C_8$-$C_{11}$ aromatic hydrocarbons | 58.5 |

Maleic anhydride (0.5% by weight corresponding to 2.0 molar equivalents based on the cyclopentadienes) was added to the main fraction (B), and it was treated at 25° C. for 30 minutes with stirring. Then, 0.5% by weight of a boron trifluoride-phenol complex catalyst was added to the treated fraction, and the fraction was polymerized at 35° C. for 2 hours. The catalyst was then decomposed with a 2% by weight aqueous solution of sodium hydroxide. The polymerization product was washed with water, and distilled at 200° C. to 210° C. and 10 mmHg to remove the unreacted components and polymers having low degrees of polymerization. Thus, a hydrocarbon resin was obtained which had the characteristics shown in Table 10.

EXAMPLES 2 TO 5 AND COMPARATIVE EXAMPLE 1

The naphtha cracking petroleum fraction (A) used in Example 1 was distilled under the same conditions as in Example 1 except that the distilling conditions were changed as shown in Table 10. Thus, main fractions (C), (D), (E), (F) and (G) having the compositions shown in Tables 4 to 8 below were obtained. Each of the main fractions was treated with maleic anhydride under the conditions shown in Table 10, and polymerized and post-treated in the same way as in Example 1. Thus, hydrocarbon resins having the characteristics given in Table 10 were obtained.

TABLE 4

(Example 2)
Composition of the fraction (C)

| Components | Content [% by weight based on the weight of the fraction (C)] |
|---|---|
| Cyclopentadienes | 0.05 |
| Styrene | 0.2 |
| α-Methylstyrene | 0.8 |
| β-Methylstyrene | 0.2 |
| Dicyclopentadiene | 0.5 |
| Vinyltoluenes (o, m, p-) | 21.9 |
| Methyldicyclopentadienes | 1.2 |
| Dimethyldicyclopentadienes | 1.7 |
| Indene | 12.7 |
| Methylindenes | 2.1 |
| Saturated $C_8$–$C_{11}$ aromatic hydrocarbons | 58.7 |

TABLE 5

(Example 3)
Composition of the fraction (D)

| Components | Content [% by weight based on the weight of the fraction (D)] |
|---|---|
| Cyclopentadienes | 0.1 |
| Styrene | 0.4 |
| α-Methylstyrene | 0.9 |
| β-Methylstyrene | 0.2 |
| Dicyclopentadiene | 0.6 |
| Vinyltoluenes (o, m, p-) | 22.1 |
| Methyldicyclopentadienes | 1.3 |
| Dimethyldicyclopentadienes | 1.7 |
| Indene | 12.6 |
| Methylindenes | 2.2 |
| Saturated $C_8$–$C_{11}$ aromatic hydrocarbons | 57.9 |

TABLE 6

(Example 4)
Composition of the fraction (E)

| Components | Content [% by weight based on the weight of the fraction (E)] |
|---|---|
| Cyclopentadienes | 0.5 |
| Styrene | 0.6 |
| α-Methylstyrene | 1.1 |
| β-Methylstyrene | 0.2 |
| Dicyclopentadiene | 0.4 |
| Vinyltoluenes (o, m, p-) | 21.4 |
| Methyldicyclopentadienes | 1.2 |
| Dimethyldicyclopentadienes | 1.6 |
| Indene | 12.2 |
| Methylindenes | 1.9 |
| Saturated $C_8$–$C_{11}$ aromatic hydrocarbon | 58.9 |

TABLE 7

(Example 5)
Composition of the fraction (F)

| Components | Content [% by weight based on the weight of the fraction (F)] |
|---|---|
| Cyclopentadienes | 0.7 |
| Styrene | 0.8 |
| α-Methylstyrene | 1.1 |
| β-Methylstyrene | 0.2 |
| Dicyclopentadiene | 0.4 |
| Vinyltoluenes (o, m, p-) | 21.0 |
| Methyldicyclopentadienes | 1.2 |
| Dimethyldicyclopentadienes | 1.6 |
| Indene | 12.0 |
| Methylindenes | 1.8 |
| Saturated $C_8$–$C_{11}$ aromatic hydrocarbons | 59.2 |

TABLE 8

(Comparative Example 1)
Composition of the fraction (G)

| Components | Content [% by weight based on the weight of the fraction (G)] |
|---|---|
| Cyclopentadienes | 1.0 |
| Styrene | 0.9 |
| α-Methylstyrene | 1.2 |
| β-Methylstyrene | 0.2 |
| Dicyclopentadiene | 0.3 |
| Vinyltoluenes (o, m, p-) | 20.6 |
| Methyldicyclopentadienes | 1.1 |
| Dimethyldicyclopentadienes | 1.5 |
| Indene | 11.7 |
| Methylindenes | 1.7 |
| Saturated $C_8$–$C_{11}$ aromatic hydrocarbons | 59.8 |

EXAMPLES 6 TO 8 AND COMPARATIVE EXAMPLES 2 AND 3

The main fraction (E) having the composition shown in Table 6 and used in Example 4 was treated under the conditions indicated in Table 1, and then polymerized and post-treated in the same way as in Example 1. Hydrocarbon resins having the characteristics shown in Table 10 were obtained.

EXAMPLE 9

The main fraction (B) having the composition shown in Table 3 and used in Example 1 was treated with maleic anhydride in the same way as in Example 1. A mixture consisting of 80 parts by weight of the treated fraction and a naphtha cracking fraction having a boiling range of −20° C. to +20° C. (polymerizable components 93.6% by weight) as shown in Table 9 was polymerized in the presence of 0.5 part by weight of a boron trifluoride/phenol complex catalyst, and post-treated in the same way as in Example 1. A hydrocarbon resin was obtained which had the characteristics shown in Table 10.

TABLE 9

Composition of the naphtha cracking fraction having a boiling range of −20 to 20° C.

| Component | Content (% by weight based on the weight of the fraction) |
|---|---|
| Propylene | 0.5 |
| iso-Butane | 0.5 |
| n-Butane | 4.6 |
| 1-Butene | 20.7 |
| iso-Butene | 25.5 |
| trans-2-Butene | 7.6 |
| cis-2-Butene | 5.6 |
| 1,3-Butadiene | 34.2 |
| $C_5$-paraffin | 0.8 |

EXAMPLES 10 AND 11

The main fraction (B) having the composition shown in Table 3 and obtained in Example 1 was treated with each of the α, β-unsaturated dicarboxylic acid anhydrides indicated in Table 10, and polymerized and post-treated in the same way as in Example 1 to afford hydrocarbon resins having the characteristics shown in Table 10.

EXAMPLES 12 TO 14

The main fraction (B) having the composition shown in Table 3 and obtained in Example 1 was treated with maleic anhydride molten at 70° C. under the conditions described in Table 10, and polymerized and post-treated in the same way as in Example 1 to afford hydrocarbon resins having the characteristics given in Table 10.

COMPARATIVE EXAMPLE 4

Maleic anhydride (4.8% by weight; corresponding to 2.0 molar equivalents based on cyclopentadienes) was added to the naphtha cracking fraction (A) having the composition given in Table 1 and used in Example 1, and with stirring, it was treated at 25° C. for 2 hours. The reaction mixture was then distilled, and a distillate oil having a boiling point of up to 120° C./20 mmHg was recovered in a yield of 97% by weight. The resulting distillate oil was polymerized and post-treated in the same way as in Example 1 to afford a hydrocarbon resin having the characteristics shown in Table 10.

COMPARATIVE EXAMPLE 5

The procedure of Comparative Example 4 was repeated except that treatment with maleic anhydride was performed at 100° C., and the distillate oil was recovered in a yield of 91% by weight. A hydrocarbon resin having the characteristics shown in Table 10 was obtained.

TABLE 10

| Example (Ex.) or Comparative Example (CEx.) | Distilling conditions | | Composition of the main fraction | | Treating conditions | | | | | |
|---|---|---|---|---|---|---|---|---|---|---|
| | Percent removal of low-boiling fraction (wt. %) | Percent removal of high-boiling fraction (wt. %) | Polymerizable components (wt. %) | Cyclopentadiene (wt. %) | α,β-Unsaturated dicarboxylic anhydride (wt. %) [molar equivalent] (*1) | | | Temperature (°C.) | Time (main) | Purification |
| Ex. 1 | 8 | 21 | 41.5 | 0.2 | Maleic anhydride | (0.5) | [2.0] | 25 | 30 | — |
| Ex. 2 | 15 | 20 | 41.3 | 0.05 | Maleic anhydride | (0.11) | [2.0] | 25 | 30 | — |
| Ex. 3 | 12 | 20 | 42.1 | 0.1 | Maleic anhydride | (0.25) | [2.0] | 25 | 30 | — |
| Ex. 4 | 6 | 19 | 41.1 | 0.5 | Maleic anhydride | (1.3) | [2.0] | 25 | 30 | — |
| Ex. 5 | 5 | 19 | 40.8 | 0.7 | Maleic anhydride | (1.8) | [2.0] | 25 | 30 | — |
| CEx. 1 | 3 | 20 | 40.2 | 1.0 | Maleic anhydride | (2.7) | [2.0] | 25 | 30 | — |
| Ex. 6 | 6 | 19 | 41.1 | 0.5 | Maleic anhyride | (0.5) | [0.8] | 50 | 15 | — |
| Ex. 7 | 6 | 19 | 41.1 | 0.5 | Maleic anhydride | (0.8) | [1.2] | 50 | 15 | — |
| Ex. 8 | 6 | 19 | 41.1 | 0.5 | Maleic anhydride | (1.8) | [2.8] | 50 | 15 | — |
| CEx. 2 | 6 | 19 | 41.1 | 0.5 | Maleic anhydride | (0.4) | [0.6] | 50 | 15 | — |
| CEx. 3 | 6 | 19 | 41.1 | 0.5 | Maleic anhydride | (2.2) | [3.4] | 50 | 15 | — |
| Ex. 9 | 8 | 21 | 41.5 | 0.2 | Maleic anhydride | (0.5) | [2.0] | 25 | 30 | — |
| Ex. 10 | 8 | 21 | 41.5 | 0.2 | Itaconic anhydride | (0.5) | [1.7] | 50 | 30 | — |
| Ex. 11 | 8 | 21 | 41.5 | 0.2 | Citraconic anhydride | (0.5) | [1.7] | 50 | 30 | — |
| Ex. 12 | 8 | 21 | 41.5 | 0.2 | Maleic anhydride | (0.5) | [2.0] | 25 | 5 | — |
| Ex. 13 | 8 | 21 | 41.5 | 0.2 | Maleic anhydride | (0.5) | [2.0] | 25 | 1 | — |
| Ex. 14 | 8 | 21 | 41.5 | 0.2 | Maleic anhydride | (0.5) | [2.0] | 25 | 0.1 | — |
| CEx. 4 | — | — | 46.3 | 1.8 | Maleic anhydride | (4.8) | [2.0] | 25 | 120 | Distillation |
| CEx. 5 | — | — | 46.3 | 1.8 | Maleic anhydride | (4.8) | [2.0] | 100 | 120 | Distillation |

| Example (Ex.) or Comparative Example (CEx.) | Hydrocarbon resin | | | | |
|---|---|---|---|---|---|
| | Yield (wt. %) | Softening point (°C.) | Color (Gardner) | Thermal stability (Gardner) | Odor |
| Ex. 1 | 38 | 131 | 6 | 10 | A |
| Ex. 2 | 39 | 132 | 6 | 10 | A |
| Ex. 3 | 39 | 131 | 6 | 10 | A |

TABLE 10-continued

| | | | | | |
|---|---|---|---|---|---|
| Ex. 4 | 39 | 132 | 6 | 10 | A |
| Ex. 5 | 38 | 132 | 6.5 | 11 | A |
| CEx. 1 | 36 | 135 | 9 | 13 | C |
| Ex. 6 | 37 | 131 | 7 | 11 | B |
| Ex. 7 | 38 | 130 | 6 | 10 | A |
| Ex. 8 | 38 | 132 | 6.5 | 10.5 | A–B |
| CEx. 2 | 37 | 130 | 9 | 13.5 | B |
| CEx. 3 | 37 | 134 | 8.5 | 12.5 | B |
| Ex. 9 | 43 | 95 | 5.5 | 9.5 | A |
| Ex. 10 | 38 | 131 | 6 | 10 | A |
| Ex. 11 | 37 | 130 | 6 | 10.5 | A |
| Ex. 12 | 39 | 132 | 6 | 10 | A |
| Ex. 13 | 38 | 130 | 6 | 10 | A |
| Ex. 14 | 38 | 131 | 6.5 | 10.5 | A |
| CEx. 4 | 39 | 132 | 8.5 | 12.5 | B |
| CEx. 5 | 37 | 130 | 7.5 | 12 | B |

(*1): Molar equivalents based on the cyclopendadienes.

EXAMPLE 15

Maleic acid (0.5% by weight; corresponding to 2.0 molar equivalents based on the cyclopentadienes) was added to the main fraction (B) having the composition shown in Table 3 and obtained in Example 1, and the fraction was treated at 40° C. for 30 minutes with stirring. The treated fraction was polymerized and post-treated in the same way as in Example 1 to afford a hydrocarbon resin having the characteristics shown in Table 11.

EXAMPLES 16 TO 19 AND COMPARATIVE EXAMPLE 6

Each of the main fractions (C) to (G) having the compositions shown in Tables 4 to 8 respectively was treated with maleic acid under the conditions indicated in Table 11, and then polymerized and post-treated in the same way as in Example 1. Thus, hydrocarbon resins having the characteristics shown in Table 11 were obtained.

EXAMPLES 20 TO 22 AND COMPARATIVE EXAMPLES 7 AND 8

The main fraction (E) having the composition shown in Table 6 and used in Example 4 was treated under the conditions shown in Table 11, and then polymerized and post-treated in the same way as in Example 1. Thus, hydrocarbon resins having the characteristics shown in Table 11 were obtained.

EXAMPLE 23

The main fraction having the composition shown in Table 3 and obtained in Example 1 was treated with maleic acid in the same way as in Example 1. A mixture of 80 parts by weight of the treated fraction and 20 parts by weight of the naphtha cracking fraction having a boiling range of −20° C. to +20° C. described in Table 9 (containing 93.6% by weight of polymerizable components) was polymerized in the presence of 0.5 part by weight of a boron trifluoride/phenol complex catalyst and post-treated in the same way as in Example 1. A hydrocarbon resin was obtained which had the characteristics described with Table 11.

EXAMPLES 24 AND 25

The main fraction having the composition described in Table 3 and obtained in Example 1 was treated with each of the α, β-unsaturated carboxylic acids shown in Table 11, and polymerized and post-treated in the same way as in Example 1. Thus, hydrocarbon resins having the characteristics shown in Table 11 were obtained.

EXAMPLES 26 AND 27

The main fraction (B) having the composition shown in Table 3 and obtained in Example 1 was treated under the conditions shown in Table 11, and polymerized and post-treated in the same way as in Example 1. Thus, hydrocarbon resins having the characteristics shown in Table 11 were obtained.

TABLE 11

| Example (Ex.) or Comparative Example (CEx.) | Distilling conditions | | Composition of the main fraction | | Treating conditions | | | |
|---|---|---|---|---|---|---|---|---|
| | Percent removal of low-boiling fraction (wt. %) | Percent removal of high-boiling fraction (wt. %) | Poly-merizable components (wt. %) | Cyclo-penta-diene (wt. %) | α,β-Unsaturated carboxylic acid (*1) (wt. %) [Molar equivalent] | | Temp-erature (°C.) | Time (min.) |
| Ex. 15 | 8 | 21 | 41.5 | 0.2 | Maleic anhydride | (0.6) [2.0] | 40 | 30 |
| Ex. 16 | 15 | 20 | 41.3 | 0.05 | Maleic anhydride | (0.13) [2.0] | 40 | 30 |
| Ex. 17 | 12 | 20 | 42.1 | 0.1 | Maleic anhydride | (0.30) [2.0] | 40 | 30 |
| Ex. 18 | 6 | 19 | 41.1 | 0.5 | Maleic anhydride | (1.6) [2.0] | 40 | 30 |
| Ex. 19 | 5 | 19 | 40.8 | 0.7 | Maleic anhydride | (2.2) [2.0] | 40 | 30 |
| CEx. 6 | 3 | 20 | 40.2 | 1.0 | Maleic anhydride | (3.2) [2.0] | 40 | 30 |
| Ex. 20 | 6 | 19 | 41.1 | 0.5 | Maleic anhydride | (0.6) [0.8] | 60 | 15 |
| Ex. 21 | 6 | 19 | 41.1 | 0.5 | Maleic | (1.0) [1.2] | 60 | 15 |

TABLE 11-continued

| | | | | | | (*1) | | | |
|---|---|---|---|---|---|---|---|---|---|
| Ex. 22 | 6 | 19 | 41.1 | 0.5 | Maleic anhydride | (2.2) | [2.8] | 60 | 15 |
| CEx. 7 | 6 | 19 | 41.1 | 0.5 | Maleic anhydride | (0.5) | [0.6] | 60 | 15 |
| CEx. 8 | 6 | 19 | 41.1 | 0.5 | Maleic anhydride | (2.6) | [3.4] | 60 | 15 |
| Ex. 23 | 8 | 21 | 41.5 | 0.2 | Maleic anhydride | (0.6) | [2.0] | 40 | 30 |
| Ex. 24 | 8 | 21 | 41.5 | 0.2 | Itaconic acid | (0.8) | [2.0] | 60 | 30 |
| Ex. 25 | 8 | 21 | 41.5 | 0.2 | Acrylic acid | (0.4) | [2.0] | 60 | 30 |
| Ex. 26 | 8 | 21 | 41.5 | 0.2 | Maleic acid | (0.6) | [2.0] | 60 | 5 |
| Ex. 27 | 8 | 21 | 41.5 | 0.2 | " | (0.6) | [2.0] | 70 | 1 |

| Example (Ex.) or Comparative Example (CEx.) | Hydrocarbon resin | | | | |
|---|---|---|---|---|---|
| | Yield (wt. %) | Softening point (°C.) | Color (Gardner) | Thermal stability (Gardner) | Odor |
| Ex. 15 | 37 | 133 | 6.5 | 10.5 | A |
| Ex. 16 | 39 | 130 | 6 | 10 | A |
| Ex. 17 | 38 | 131 | 6 | 10 | A |
| Ex. 18 | 37 | 130 | 6.5 | 11 | A |
| Ex. 19 | 35 | 130 | 7 | 11 | A |
| CEx. 6 | 31 | 131 | 10 | 14 | C |
| Ex. 20 | 37 | 132 | 7 | 11 | B |
| Ex. 21 | 37 | 130 | 6.5 | 10.5 | A |
| Ex. 22 | 36 | 130 | 7 | 11 | A-B |
| CEx. 7 | 37 | 131 | 9 | 14 | B |
| CEx. 8 | 35 | 132 | 8.5 | 12.5 | B |
| Ex. 23 | 41 | 96 | 5.5 | 9.5 | A |
| Ex. 24 | 36 | 132 | 6 | 10 | A |
| Ex. 25 | 35 | 130 | 6.5 | 10.5 | A |
| Ex. 26 | 37 | 130 | 6 | 10 | A |
| Ex. 27 | 38 | 131 | 7 | 10.5 | A |

(*1): Molar equivalents based on cyclopentadienes.

EXAMPLE 28

Maleimide (0.4% by weight; corresponding to 1.5 molar equivalents based on cyclopentadienes) was added to the main fraction (B) having the composition shown in Table 3 and obtained in Example 1, and the fraction was treated at 40° C. for 30 minutes with stirring. The treated fraction was polymerized and post-treated in the same way as in Example 1 to afford a hydrocarbon resin having the characteristics shown in Table 12.

EXAMPLES 29 TO 31 AND COMPARATIVE EXAMPLE 9

The naphtha cracking fraction (A) having the composition shown in Table 1 and used in Example 1 was distilled under the same conditions as in Example 1 except that the distilling conditions were changed as shown in Table 12. Thus, the main fractions (C), (E), (F) and (G) having the compositions shown in Tables 4 and 6 to 8 respectively were obtained. These main fractions were treated with maleinimide under the conditions shown in Table 12, and then polymerized and post-treated in the same way as in Example 1 to afford hydrocarbon resins having the characteristics shown in Table 12.

EXAMPLES 32 and 33

The main fraction (B) having the composition shown in Table 3 and used in Example 1 was treated under the conditions shown in Table 12, and polymerized and post-treated in the same way as in Example 1 to afford hydrocarbon resins having the characteristics shown in Table 12.

EXAMPLES 34 TO 36

The main fraction (B) having the composition shown in Table 3 and obtained in Example 1 was treated with each of the unsaturated polar compounds described in Table 12, and polymerized and post-treated in the same way as in Example 1 to afford hydrocarbon resins having the characteristics shown in Table 12.

EXAMPLES 37 AND 38

The main fraction (B) having the composition shown in Table 3 and obtained in Example 1 was treated with maleimide under the conditions shown in Table 12, and polymerized and post-treated in the same way as in Example 1 to afford hydrocarbon resins having the characteristics shown in Table 12.

TABLE 12

| Example (Ex.) or Comparative | Distilling conditions | | Composition of the main fraction | | Treating conditions | |
|---|---|---|---|---|---|---|
| | Percent removal of low-boiling | Percent removal of high-boiling | Poly-merizable | Cyclo-penta- | Unsaturated polar compound | Temp- |

TABLE 12-continued

| Example (CEx.) | fraction (wt. %) | fraction (wt. %) | components (wt. %) | diene (wt. %) | (wt. %) [molar equivalents] (*1) | | | erature (°C.) | Time (min.) |
|---|---|---|---|---|---|---|---|---|---|
| Ex. 28 | 8 | 21 | 41.5 | 0.2 | Maleimide | (0.4) | [1.5] | 40 | 30 |
| Ex. 29 | 15 | 20 | 41.3 | 0.05 | " | (0.1) | [1.5] | 40 | 30 |
| Ex. 30 | 6 | 19 | 41.1 | 0.5 | " | (1.0) | [1.5] | 40 | 30 |
| Ex. 31 | 5 | 19 | 40.8 | 0.7 | " | (1.4) | [1.5] | 40 | 30 |
| CEx. 9 | 3 | 20 | 40.2 | 1.0 | " | (2.0) | [1.5] | 40 | 30 |
| Ex. 32 | 8 | 21 | 41.5 | 0.2 | " | (0.3) | [1.2] | 60 | 20 |
| Ex. 33 | 8 | 21 | 41.5 | 0.2 | " | (0.5) | [2.0] | 60 | 20 |
| Ex. 34 | 8 | 21 | 41.5 | 0.2 | Diethyl maleate | (0.8) | [1.7] | 50 | 40 |
| Ex. 35 | 8 | 21 | 41.5 | 0.2 | Tetracyano-ethylene | (0.6) | [1.7] | 50 | 40 |
| Ex. 36 | 8 | 21 | 41.5 | 0.2 | p-Benzoqui-none | (0.5) | [1.7] | 50 | 40 |
| Ex. 37 | 8 | 21 | 41.5 | 0.2 | Maleimide | (0.4) | [1.5] | 70 | 5 |
| Ex. 38 | 8 | 21 | 41.5 | 0.2 | " | (0.4) | [1.5] | 70 | 1 |

| Example Ex. or Comparative Example (CEx.) | Hydrocarbon resin | | | | |
|---|---|---|---|---|---|
| | Yield (wt. %) | Softening point (°C.) | Color (Gardner) | Thermal stability (Gardner) | Odor |
| Ex. 28 | 37 | 130 | 6 | 10 | A |
| Ex. 29 | 39 | 131 | 6 | 10 | A |
| Ex. 30 | 37 | 131 | 6.5 | 10.5 | A |
| Ex. 31 | 36 | 130 | 7 | 11 | A |
| CEx. 9 | 35 | 133 | 9 | 13.5 | C |
| Ex. 32 | 38 | 132 | 6 | 10 | A |
| Ex. 33 | 37 | 130 | 6.5 | 10.5 | A |
| Ex. 34 | 36 | 131 | 7 | 11 | A |
| Ex. 35 | 37 | 132 | 6 | 10.5 | A |
| Ex. 36 | 39 | 130 | 6.5 | 10.5 | A |
| Ex. 37 | 36 | 130 | 6 | 10 | A |
| Ex. 38 | 37 | 132 | 6.5 | 10.5 | A |

(*1): Molar equivalents based on cyclopentadienes.

What we claim is:

1. A process for producing a hydrocarbon resin having improved color and thermal stability, which comprises contacting a petroleum cracking or reforming fraction containing at least 20% by weight of cationically polymerizable hydrocarbons and not more than 0.7% by weight, based on the fraction, of cyclopentadienes and having a boiling range of from 140° C. to 280° C., with 0.8 to 3.0 moles, per mole of the cyclopentadienes, of a dienophile compound having a carbon-to-carbon double bond and a carbonyl or cyano group adjacent to the double bond; and then polymerizing the treated petroleum fraction in the presence of a polymerization catalyst.

2. The process of claim 1 wherein said petroleum fraction is prepared by removing cyclopentadienes from a petroleum cracking or reforming fraction containing at least 20% by weight of cationically polymerizable hydrocarbons and at least about 1% by weight, based on the fraction, of the cyclopentadienes, and having a boiling range of from 140° C. to 280° C. until the content of the cyclopentadienes decreases to not more than 0.7% by weight based on the fraction.

3. The process of claim 2 wherein said removal of the cyclopentadienes is carried out by fractional distillation.

4. The process of claim 1 wherein said petroleum fraction contains 0.01 to 0.5% by weight, based on the fraction, of the cyclopentadienes.

5. The process of claim 1 wherein said dienophile compound is selected from the group consisting of $\alpha,\beta$-unsaturated carboxylic acids and anhydrides, esters, amides and imides thereof, $\alpha,\beta$-unsaturated nitriles, $\alpha,\beta$-unsaturated aldehydes and quinones.

6. The process of claim 1 wherein said dienophile compound is an $\alpha,\beta$-unsaturated dicarboxylic acid anhydride.

7. The process of claim 6 wherein said $\alpha,\beta$-unsaturated dicarboxylic acid anhydride is selected from aliphatic or alicyclic $\alpha,\beta$-unsaturated dicarboxylic acid anhydrides containing up to 15 carbon atoms.

8. The process of claim 6 wherein said $\alpha,\beta$-unsaturated dicarboxylic acid anhydride is a member selected from the group consisting of maleic anhydride, itaconic anhydride, citraconic anhydride and tetrahydrophthalic anhydride.

9. The process of claim 6 wherein said $\alpha,\beta$-unsaturated dicarboxylic acid anhydride is maleic anhydride.

10. The process of claim 1 wherein the amount of said dienophile compound is 2 to 2.5 moles per mole of the cyclopentadienes.

11. The process of claim 1 wherein said contacting of the petroleum fraction is carried out at a temperature of from 10° C. to 100° C.

12. The process of claim 1 wherein said contacting of the petroleum fraction is carried out at a temperature of from room temperature to less than 50° C.

13. The process of claim 1 wherein said contacting of the petroleum fraction is carried out for at least 30 seconds.

14. The process of claim 12 wherein said contacting of the petroleum fraction is carried out for 1 minute to 1 hour.

15. The process of claim 1 wherein said polymerization is carried out at a temperature of from −30° C. to +80° C. in the presence of a Friedel-Crafts catalyst.

16. A process for producing a hydrocarbon resin having improved color and thermal stability which comprises contacting a petroleum cracking or reforming fraction containing 30 to 75% by weight of cationically polymerizable hydrocarbons and from 0.01 to 0.5% by weight, based on the fraction, of cyclopentadienes and having a boiling range of from 140° C. to 240° C., with 0.8 to 3.0 moles, per mole of the cyclopentadienes, of a dienophile compound having a carbon-to-carbon double bond and a carbonyl or cyano group adjacent to the double bond and selected from the group consisting of $\alpha,\beta$-unsaturated carboxylic acids and anhydrides, esters, amides and imides thereof, $\alpha,\beta$-unsaturated nitriles, $\alpha,\beta$-unsaturated aldehydes and quinones, at a temperature of from 10° C. to 100° C. for at least 30 seconds; and then polymerizing the treated petroleum fraction at a temperature of from $-30°$ C. to $+80°$ C. in the presence of a Friedel-Crafts catalyst.

17. The process of claim 16 wherein the petroleum cracking or reforming fraction initially contains at least 1% by weight, based on the fraction, of the cyclopentadienes, and the content of the cyclopentadienes is decreased to not more than 0.7% by weight based on the fraction, by removing the cyclopentadienes by fractionally distilling the petroleum fraction.

18. The process of claim 17 wherein said fractional distillation is continued until the petroleum fraction contains 0.01 to 0.5% by weight, based on the fraction, of the cyclopentadienes.

19. The process according to claim 18 wherein the dienophile is selected from the group consisting of aliphatic and alicyclic $\alpha,\beta$-unsaturated dicarboxylic acid anhydrides containing up to 15 carbon atoms and is used in an amount of from 2 to 2.5 moles per mole of the cyclopentadienes; and wherein the contacting of the petroleum fraction is carried out for 1 minute to 1 hour at a temperature of from room temperature to less than 50° C.

20. The process of claim 2 wherein said removal of the cyclopentadienes is carried out by heat-treating the petroleum cracking or reforming fraction at a temperature of 50° to 250° C. for at least 0.5 minutes with an $\alpha,\beta$-unsaturated dicarboxylic acid anhydride to form an adduct of cyclopentadienes with the acid anhydride and removing said adduct by distillation.

21. A process for producing a hydrocarbon resin having improved color and thermal stability from a petroleum cracking or reforming fraction containing at least 20% by weight of cationically polymerizable hydrocarbons and at least about 1% by weight, based on the fraction, of the cyclopentadienes, and having a boiling range of from 140° C. to 280° C., which comprises reducing the content of the cyclopentadienes in the petroleum fraction to from 0.1 to 0.5% by weight, based on the fraction, treating the fraction of reduced cyclopentadienes content with from 2 to 2.5 moles, per mole of the cyclopentadienes, of a dienophile compound having a carbon-to-carbon double bond and a carbonyl or cyano group adjacent to the double bond; and selected from the group consisting of $\alpha,\beta$-unsaturated carboxylic acids and anhydrides, esters, amides and imides thereof, $\alpha,\beta$-unsaturated nitriles, $\alpha,\beta$-unsaturated aldehydes and quinones, at a temperature of from room temperature to less than 50° C., for from 1 minute to 1 hour; and then polymerizing the treated petroleum fraction at a temperature of from $-10°$ C. to 50° C. in the presence of a Friedel-Crafts catalyst.

22. The process of claim 21 wherein said petroleum cracking or reforming fraction has a boiling range of from 140° C. to 240° C. and contains 30 to 75% by weight, based on the weight of the fraction, of cationically polymerizable hydrocarbons.

23. The process according to claim 22 wherein said dienophile is a member selected from the group consisting of maleic anhydride, itaconic anhydride, citraconic anhydride and tetrahydrophthalic anhydride.

* * * * *

UNITED STATES PATENT AND TRADEMARK OFFICE
CERTIFICATE OF CORRECTION

PATENT NO. : 4,230,840
DATED : October 28, 1980
INVENTOR(S) : Shigeru Katayama etal.

It is certified that error appears in the above—identified patent and that said Letters Patent is hereby corrected as shown below:

On The Title Page Insert:

-- (30) Foreign Application Priority Data

Dec. 26, 1977    Japan   52-155578

Aug. 28, 1978    Japan   52-103828

Aug. 28, 1978    Japan   52-103829   --.

Signed and Sealed this

Third Day of March 1981

[SEAL]

Attest:

RENE D. TEGTMEYER

Attesting Officer    Acting Commissioner of Patents and Trademarks